March 16, 1943.  W. C. SPEAR ET AL  2,313,975
ELECTRIC MOTOR SYSTEM
Filed May 23, 1939
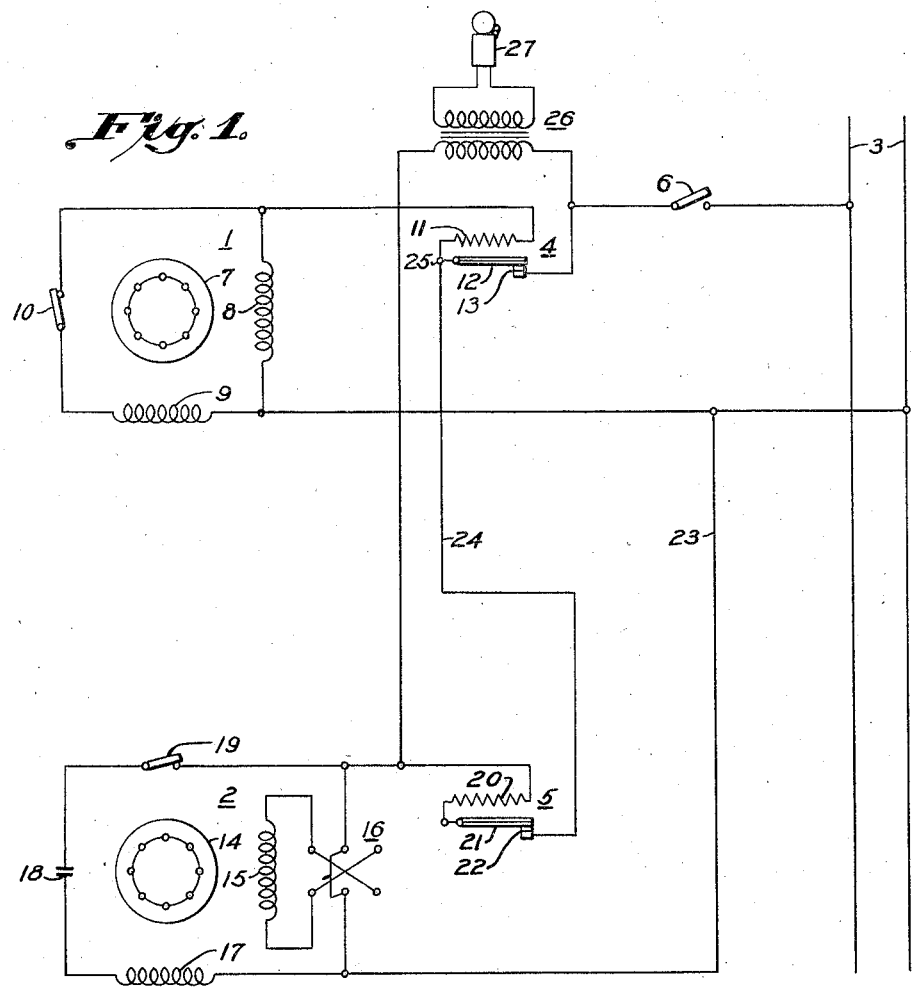
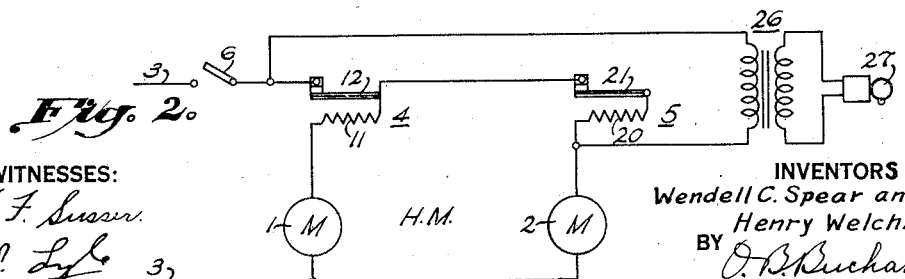
WITNESSES:
N. F. Susser
F. P. Lyle
INVENTORS
Wendell C. Spear and
Henry Welch.
BY O. B. Buchanan
ATTORNEY Patented Mar. 16, 1943

2,313,975

UNITED STATES PATENT OFFICE 2,313,975

ELECTRIC MOTOR SYSTEM

Wendell C. Spear, Wapakoneta, and Henry Welch, Lima, Ohio, assignors to Westinghouse Electric & Manufacturing Company, East Pittsburgh, Pa., a corporation of Pennsylvania Application May 23, 1939, Serial No. 275,148

2 Claims. (Cl. 177—311)

The present invention relates to an electric motor system, and more particularly, to an arrangement for interlocking the individual protective devices of a plurality of motors supplied from the same line.

Although the invention is of general application, it is particularly suitable for motors of relatively small capacity provided with individual thermostats for disconnecting them from the line in response to an abnormal increase in temperature resulting from failure of the motor, or from any other cause. There are many applications of such motors in which two or more motors are supplied from the same line, and in which it is desirable to disconnect all of the motors from the line when failure of one particular motor occurs but not in case of failure of any of the other motors. One example of such an application is an automatic stoker drive, in which one motor drives a fan for creating a draft in the furnace, and a second motor drives a feed mechanism for supplying coal to the furnace. In case of failure of the fan motor, it is highly desirable to stop the feed motor as well in order to prevent the continued supply of coal to the furnace after the draft is stopped, but in case the feed motor should fail, it is desirable for the fan to continue operating in order to continue supplying heat as long as the coal in the furnace lasts. It is also desirable in such a system to provide an alarm signal which will operate in case of failure of either of the motors to indicate that such failure has occurred. This application of the invention is mentioned only by way of example, since there are many other applications involving two or more motors for which the present invention is equally suitable.

The object of the invention, therefore, is to provide an electric motor system in which a plurality of motors having individual protective devices, such as thermostats, are supplied from a singe line, and in which the individual protective devices are interlocked in such a manner that failure of one of the motors will cause all of them to be disconnected from the line, while failure of any one of the other motors will cause only the motor involved to be disconnected.

A further object of the invention is to provide an electric motor system having individual protective devices for each motor which are interlocked in the manner stated above, and in which an alarm device is provided which is actuated in response to operation of any one of the protective devices.

Further objects and advantages will be apparent from the following detailed description, taken in connection with the accompanying drawing, in which Fig. 1 is a wiring diagram showing a preferred embodiment of the invention, and Fig. 2 is a simplified diagram of the circuit connections.

The invention is shown in the drawing as applied to a system comprising two single-phase motors 1 and 2 which are connected in parallel to a single-phase supply line 3. The motors each have individual thermostatic protective devices 4 and 5, respectively, and are connected to the line 3 through a main line switch 6. Any desired type of motors can be used, and as shown in Fig. 1, the motor 1 is of the split phase type, having a rotor 7 with a short-circuited squirrel cage winding, a main stator winding 8, and a high resistance starting winding 9 which is spatially displaced from the main winding 90 electrical degrees. The starting winding is connected across the line in series with a centrifugal switch 10, which disconnects it after the motor has reached a sufficiently high speed, and provides starting torque for the motor in the usual manner. The thermostatic protective device 4 for the motor 1 consists of a heating element 11, which is connected in series with the motor so as to carry its line current, and a thermally responsive element or thermostat 12, which operates to open its contacts 13 when its temperature exceeds a predetermined value as a result of an abnormal increase in the line current or an abnormally high ambient temperature. The contacts 13 are connected in series between the heating element 11 and the line 3.

The motor 2 is shown in Fig. 1 as a reversible, capacitor start motor, having a rotor member 14 with a short-circuited squirrel cage winding, a main stator winding 15, which is connected to the line through a reversing switch 16, and a starting or capacitor winding 17, which is connected across the line in series with a capacitor 18 and centrifugal switch 19. The winding 17 is displaced spatially 90° from the main winding 15, and, because of the phase displacement of the current in this winding caused by the capacitor 18, it will cause the motor to start in the well known manner. The centrifugal switch 19 disconnects the starting winding when the motor has reached a sufficiently high speed. The thermostatic protective device 5 associated with the motor 2 is similar to the protective device 4 previously described, and consists of a heating element 20 connected in series with the motor so as to carry its line current, and a thermostat element 21 which operates to open its contacts 22 when its temperature exceeds a predetermined value.

As stated above, the motor 1 is connected directly to the line 3 through the line switch 6 and the motor 2 is connected in parallel with the motor 1 through conductors 23 and 24. Since the protective devices 4 and 5 are interlocked, however, in order to obtain the desired operation, the conductor 24 is not connected directly to the line, but is connected to the thermostatic device 4 at a terminal 25 between the heating element 11 and the thermostat 12. It will be seen that because of this connection the heating element 11 of the protective device 4 carries the line current of the motor 1 only, but that the contacts 13 carry the combined currents of both the motors 1 and 2. As a result of this connection, if failure of motor 1 occurs, or if, for any other reason, the thermostat 12 is caused to open its contacts, both motors will be disconnected from the line, since the current for both motors flows through the contacts 13. Thus, failure of motor 1 will result in disconnecting both motors from the line. In case of failure occurring in motor 2, however, or if for any other reason the protective device 5 operates, the opening of the contacts 22 will disconnect motor 2 from the line but will have no effect on the operation of motor 1. It will be seen, therefore, that with this connection the individual protective devices of the two motors are interlocked in such a manner that failure of motor 1 will cause both motors to be disconnected from the line, while failure of motor 2 will disconnect only that motor and will have no effect on the operation of motor 1.

It will be readily apparent that any desired number of motors can be connected in parallel in this manner. In case three or more motors are used, successive motors may be connected either between the heating element and the thermostat contacts of the preceding motor or on the line side of the thermostat contacts. In the first case, failure of any motor after the first will cause disconnection of all the motors connected after it, while in the second case only the motor that has failed will be disconnected.

It is desirable in many applications for which the arrangement described herein is suitable to provide an alarm or signal means to indicate that failure of one or more of the motors has occurred. Such an alarm may be readily provided by means of a transformer 26 which has one end of its primary winding connected between the protective device 4 and the line 3, and the other end connected between the protective device 5 and the motor 2. An alarm, such as a bell 27 or other suitable audible or visual signal, is connected to the secondary winding of the transformer. A transformer of this type has relatively high impedance, and it will be seen that when the motors are operating normally the primary of the transformer is short-circuited through the contacts 13, conductor 24, contacts 22 and heating element 20, so that no current flows through it and the alarm is not actuated. When either of the protective devices 4 or 5 opens its contacts, however, this short-circuit is removed, and the transformer is then subjected to practically the full line voltage, since it is connected directly to the line through the motor 2 and conductor 23, so that the bell 27 will be energized to indicate that one or the other of the protective devices has operated. Since the impedance of the transformer is quite high, the current drawn by it, which flows through the windings of the motor 2, will be very small, and since the voltage drop across the transformer will be relatively high, the voltage applied to the motor 2 will be so small that it will have no tendency to cause rotation of the motor.

It will be seen, therefore, that a relatively simple arrangement has been provided by which the individual protective devices of a plurality of motors connected in parallel to the same supply line can be interlocked so that failure of one of the motors will cause all of the motors connected after it to be disconnected from the line, while failure of any other motor will cause only the motor involved to be disconnected. It will be obvious that such a system is of wide application and can be used with motors of any type, either single-phase or three-phase, and with any desired number of motors. When three-phase motors are used, it is desirable to use two protective devices for each motor to disconnect two phases of the winding, but the connections are made just as described above for single-phase motors.

It is to be understood, therefore, that although a specific embodiment of the invention has been shown in the drawing for the purpose of illustration, it is not limited to the exact arrangement shown, but is applicable to any type or number of motors, using any desired type of individual protective devices. The invention is, therefore, capable of many embodiments and modifications, and is not limited to the exact arrangement shown, but in its broadest aspect, it includes all equivalent embodiments and modifications which come within the scope of the appended claims.

We claim as our invention:

1. In combination, a first electric motor having terminals adapted to be connected to an electric supply line, means for connecting said motor terminals to said line, a first thermally-responsive protective device for said first motor, said protective device including an electric heating element and a thermally-responsive circuit-interrupting element in heat-exchange relation thereto, said circuit-interrupting element having normally closed contacts, said heating element and contacts being connected in series between one of the motor terminals and the line with the contacts on the line side, a second electric motor having terminals adapted to be connected to said supply line, a second thermally-responsive protective device for said second motor, said second protective device including an electric heating element and a thermally-responsive circuit-interrupting element, the heating element and circuit-interrupting element being connected in series with each other and with one of the terminals of said second motor, means for connecting said second protective device to the first protective device at a point between the heating element and the contacts of the first protective device, whereby the contacts of both protective devices are in series between the line and the second motor, and means for connecting the other terminal of the second motor to the supply line.

2. In combination, a first electric motor having terminals adapted to be connected to an electric supply line, means for connecting said motor terminals to said line, a first thermally-responsive protective device for said first motor, said protective device including an electric heating element and a thermally-responsive circuit-interrupting element in heat-exchange relation thereto, said circuit-interrupting element having normally closed contacts, said heating element and contacts being connected in series between one of the motor terminals and the line with the contacts on the line side, a second electric motor having terminals adapted to be connected to said supply line, a second thermally-responsive protective device for said second motor, said second protective device including an electric heating element and a thermally-responsive circuit-interrupting element, the heating element and circuit-interrupting element being connected in series with each other and with one of the terminals of said second motor, means for connecting said second protective device to the first protective device at a point between the heating element and the contacts of the first protective device, whereby the contacts of both protective devices are in series between the line and the second motor, means for connecting the other terminal of the second motor to the supply line, a transformer connected across said series-connected contacts of the first and second protective devices, and alarm means connected to said transformer to be energized thereby.

WENDELL C. SPEAR.
HENRY WELCH.